(12) United States Patent
Buckelew (10) Patent No.: US 8,768,752 B1
(45) Date of Patent: Jul. 1, 2014

(54) COMPASS—COMPUTER SYSTEM FOR EMPLOYEE EVALUATION AND COACHING

(75) Inventor: Alan B. Buckelew, Los Angeles, CA (US)

(73) Assignee: Princess Cruise Lines, Ltd., Santa Clarita, CA (US)

( * ) Notice: Subject to any disclaimer, the term of this patent is extended or adjusted under 35 U.S.C. 154(b) by 0 days.

(21) Appl. No.: 13/606,684

(22) Filed: Sep. 7, 2012

(51) Int. Cl.
*G06Q 10/00* (2012.01)

(52) U.S. Cl.
USPC .......................................... 705/7.42; 705/7.38

(58) Field of Classification Search
CPC ............................... G06Q 10/10; G06Q 10/06
USPC ........................................ 705/7.14, 7.42, 7.38
See application file for complete search history.

(56) References Cited

U.S. PATENT DOCUMENTS

| | | | |
|---|---|---|---|
| 5,111,391 A | 5/1992 | Fields et al. | |
| 5,696,702 A | 12/1997 | Skinner et al. | |
| 5,913,201 A | 6/1999 | Kocur | |
| 6,049,776 A | 4/2000 | Donnelly et al. | |
| 6,970,829 B1 | 11/2005 | Leamon | |
| 7,155,399 B2 | 12/2006 | Andre et al. | |
| 7,672,746 B1 | 3/2010 | Hamilton et al. | |
| 7,878,909 B2 | 2/2011 | Kessman et al. | |
| 8,260,644 B2 | 9/2012 | Buckelew et al. | |
| 2002/0040313 A1 | 4/2002 | Hunter et al. | |
| 2003/0191678 A1 | 10/2003 | Shetty et al. | |
| 2004/0088177 A1* | 5/2004 | Travis et al. | 705/1 |
| 2004/0267591 A1 | 12/2004 | Hedlund et al. | |
| 2008/0183547 A1 | 7/2008 | Halaby | |
| 2008/0300953 A1* | 12/2008 | Sarlay | 705/9 |
| 2009/0018876 A1* | 1/2009 | Mendoza | 705/7 |
| 2009/0043635 A1 | 2/2009 | Mori | |
| 2009/0187471 A1* | 7/2009 | Beaton et al. | 705/10 |

OTHER PUBLICATIONS

Leadership dyads in the cruise industry: the impact of cultural congruency—by Mark R. Testa—2002 Elsevier Science Ltd.*

* cited by examiner

*Primary Examiner* — Andre Boyce
*Assistant Examiner* — Ernest A Jackson
(74) *Attorney, Agent, or Firm* — K&L Gates LLP (57) ABSTRACT

Various embodiments of the present invention provide improved computer systems for the evaluation of the performance of employees. Embodiments may use an engagement algorithm to calculate a single engagement score for each employee. Embodiments may use a second algorithm for skills to calculate a single skills score for each employee. A third algorithm may plot the employee's engagement score against the employee's skills score on a two-dimensional graph and indicate what scores are needed for a good evaluation and what scores are needed for a great evaluation. Various embodiments of the invention prescribe specific aspects of a job to coach to improve the employee's performance. Embodiments of the system archive and maintain all evaluations and scores for employees and provide access to them to subsequent supervisors.

12 Claims, 10 Drawing Sheets

Role Description: Stateroom Steward, Housekeeping

Mission: Be the Consummate Host by delighting and serving our passengers and creating memories by taking a personal interest in passengers, anticipating their needs, responding promptly and appropriately to their service requests, and providing stateroom service with care to ensure a gracious housekeeping experience.

Personal characteristics:

(1)  Understanding of the foundation of customer service; ability and willingness to deliver outstanding service to our passengers.

(2)  Motivation to excel in all aspects of job duties and responsibilities.

(3)  Personable communicator with outstanding social skills and a warm, friendly, and caring personality.

(4)  Willingness to embrace all Company values and Service Credo and lead by example.

(5)  Commitment to continuously display and deliver genuine care to our passengers and staff and surprise and delight them throughout their cruise experience.

(6)  Ability to adapt and adjust to a variety of circumstances.

Key Result Areas (KRAs)

All Key Result Areas require 100% commitment and focus to perform the role successfully.

Role-Specific KRAs: (Each KRA (i.e., A below) is followed by specific Activities (i.e., 1-5 below))

A.  Product Delivery and Standards

1.  Always prepares passenger staterooms and alleyways in readiness for embarkation.

FIGURE 3B

2. Always upholds the Company's standard of housekeeping, sanitation, and maintenance in passenger staterooms and associated areas.

3. Consistently provides twice-daily stateroom service to staterooms in a discreet and efficient manner.

4. Always picks up and returns passenger items for laundry service within the time scale of the service selected; follows up to ensure passenger satisfaction.

5. Always follows appropriate procedures for the correct handling and sorting of garbage, bio-hazardous, and sharps waste.

B. Customer Satisfaction

1. Provides a positive first impression to every passenger through a warm, welcoming individual greeting; always maintains a spotless and professional appearance.

2. Promptly and clearly outlines the safety features, amenities, and services detailed in the Stateroom Steward Training Manual.

3. Nurtures a memorable connection with every passenger by showing genuine interest during service, engaging in conversation using passengers' family name, and always remaining fully engaged throughout the voyage.

4. Always observes and identifies passengers' preferences and adjusts service accordingly, anticipating passengers' needs and offering appropriate responses without the customer having to ask. Appropriately acknowledges special occasions.

5. Demonstrates to every passenger that his or her satisfaction is our top priority by immediately acknowledging every request, responding promptly and effectively to resolve any service request or concern (escalating to supervisor where necessary), and following up to ensure passenger satisfaction.

C. Cost/Revenue

1. Avoids waste by properly and efficiently using consumable items and cleaning chemicals for the assigned section.

2. Always keeps assigned equipment clean and in good condition, avoiding misuse and unjustifiable wear and tear.

FIGURE 3C

Shared KRAs:

A.   Safety and Compliance

1.   Always performs all duties in accordance with the Stateroom Steward Training Manual, Public Health Policy and Procedure, and any other applicable policies and procedures.

2.   Always notifies appropriate managers of any non-compliance with the RSA Program.

3.   Always follows timekeeping rules and creates accurate ILO records.

4.   Performs all General Emergency Organization duties as directed in the Emergency Response Organization.

B.   C.R.U.I.S.E. and Core Values

1.   Demonstrates commitment to the Company's values, beliefs, goals, and initiatives. Consistently upholds our Core Values and the C.R.U.I.S.E. philosophy.

2.   Acts as a Company representative and always portrays a positive image of Princess Cruises to all passengers, officers, and crew.

3.   Always maintains professional, effective, and motivated working relationships across all functions, taking into account differences in cultures, backgrounds, and individual personalities.

4.   Proudly wears the C.R.U.I.S.E. pin and displays the Service Credo card at all times.

In addition to the Key Result Areas and Activities listed in this Role Description, employee also performs any other duties as assigned by management.

The percentages listed below indicate the percent of your appraisal that will be based on that Key Result Area (KRA weights).

1.   Product Delivery and Standards: 50%

2.   Customer Satisfaction: 30%

3.   Cost/Revenue: 5%

4.   Safety and Compliance: 5%

5.   C.R.U.I.S.E. and Core Values: 10%

FIGURE 4A

Role Description: Waiter, Food and Beverage Services

Mission: Be the Consummate Host by delighting and serving our passengers; create memories by taking a personal interest in passengers, anticipating their needs, responding promptly and appropriately to their service requests, and presenting food and beverages with care to ensure a smooth and gracious dining experience.

Personal Characteristics:

(1) Understanding of the foundation of customer service; ability and willingness to deliver outstanding service to our passengers.

(2) Thorough knowledge of food, beverage, and wine menus used throughout the fleet.

(3) Motivation to excel in all aspects of job duties and responsibilities.

(4) Personable communicator with outstanding social skills and a warm, friendly, and caring personality.

(5) Willingness to embrace all Company values and Service Credo and lead by example.

(6) Commitment to continuously display and deliver genuine care to our passengers and surprise and delight them throughout their cruise experience.

(7) Ability to adapt and adjust to a variety of circumstances.

Key Result Areas (KRAs)

All Key Result Areas require 100% commitment and focus to perform the role successfully.

FIGURE 4B

Role-Specific KRAs:

A.  Customer Satisfaction

1. Provides a positive first impression to every passenger through a warm, welcoming individual greeting; always maintains a spotless and professional appearance.

2. Nurtures a memorable connection with every passenger by always showing genuine interest during service and remaining fully engaged throughout the voyage.

3. Always observes and identifies passengers' preferences and adjusts service accordingly, anticipating passengers' needs and offering appropriate responses without the customer having to ask.

4. Demonstrates to every passenger that his or her satisfaction is our top priority by immediately acknowledging every request, responding promptly and effectively to resolve any service request or concern, and following up to ensure passenger satisfaction.

5. Always leaves a positive last impression by providing a genuine and warm closing to the service.

B.  Product Delivery and Standards

1. Creates a comfortable, elegant ambience by always preparing table settings and maintaining service stations in line with all Company standards.

2. Consistently provides helpful explanations and suggestions on the menu and offers assistance with wine pairings.

3. Always delivers food and beverages as requested, in a timely manner, in the correct service order; follows up to ensure each passenger's needs have been met and suggest solutions to any issues.

4. Always seeks to increase expertise and knowledge of the vessel's dining outlets and their respective operation hours in order to provide flexible options for passengers' individual preferences.

C.  Cost/Revenue

1. Maximizes wine and beverage sales by offering relevant choices in an inviting manner.

FIGURE 4C

2. Sensitively executes sales promotions and special event notifications as directed by the Maitre d' Hotel without interfering with passengers' enjoyment of the dining experience.

3. Minimizes overall costs by always handling and storing equipment and supplies with care.

D. Staff Development and Management

1. Encourages and supports the growth, engagement and development of the Junior Waiter by providing targeted coaching and training in all aspects of the role.

2. Effectively coaches the Junior Waiter to always interact with passengers and crew in accordance with the C.R.U.I.S.E. credo.

Shared KRAs:

A. Safety and Compliance

1. Always follows all Company guidelines, policies, and procedures, including USPH protocols.

2. Always follows compliance regulations for processing bills, Cruise Card handling, Micros postings, and other confidential passenger information.

3. Always follows timekeeping rules and creates accurate ILO records.

4. Executes all responsibilities for passenger embarkation/disembarkation, government inspections, and required emergency duties as directed.

5. Always supports the coordination of onboard resources and responses in case of increased sanitation levels driven by any outbreak situations.

6. Always notifies appropriate managers of any non-compliance with the RSA Program.

B. C.R.U.I.S.E. and Core Values

1. Demonstrates commitment to the Company's values, beliefs, goals, and initiatives. Consistently upholds our Core Values and the C.R.U.I.S.E. philosophy.

FIGURE 4D

2. Acts as a Company representative and always portrays a positive image of Princess Cruises to all passengers, officers, and crew.

3. Always maintains professional, effective, and motivated working relationships, taking into account differences in cultures, backgrounds, and individual personalities.

4. Proudly wears the C.R.U.I.S.E. pin and displays the Service Credo card at all times.

In addition to the Key Result Areas and performance items listed in this Role Description, employee also performs any other duties as assigned by management.

The percentages listed below indicate the percent of your appraisal that will be based on that Key Result Area (KRA weights).

1. Customer Satisfaction: 40%

2. Product Delivery and Standards: 25%

3. Cost/Revenue: 15%

4. Staff Development and Management: 10%

5. Safety and Compliance: 5%

6. C.R.U.I.S.E. and Core Values: 5%

FIGURE 5

COMPASS—COMPUTER SYSTEM FOR EMPLOYEE EVALUATION AND COACHING

BACKGROUND

1. Field of Invention

Embodiments of the present invention relate to human resources ("HR") computer systems generally. More specifically, embodiments of the present invention relate to HR computer systems for the evaluation, tracking and coaching of employees and other workers. Even more specifically, embodiments of the present invention are adapted to apply to the crews of ships, including large holiday cruise ships.

2. Description of Related Art

Computer systems are known, and computer systems for human resource applications are known. However, there is a need to improve these systems to increase their effectiveness for the evaluation of employees, and specifically to develop features that allow for the measurement of engagement and the tracking and coaching over time of employees to improve their performance and to adapt the same for the crews of ships.

SUMMARY OF EMBODIMENTS OF INVENTION

Embodiments of the present invention may provide improved computer systems for the evaluation of the performance of employees. Furthermore, for each Role Description (that is, for each unique job definition), specific Key Result Areas ("KRAs") are defined, and for each KRA specific Activities are defined. In various embodiments, for each employee that is evaluated, each evaluator evaluates the employee for the Activities for the KRAs for that employee's job. An engagement algorithm then calculates a single engagement score for that employee, giving a weighted value to the evaluated engagement level for each Activity for each KRA. A second algorithm for skills calculates a single skills score for each employee, given a weighted value to each Activity evaluation for each KRA for that employee.

Figure 1:
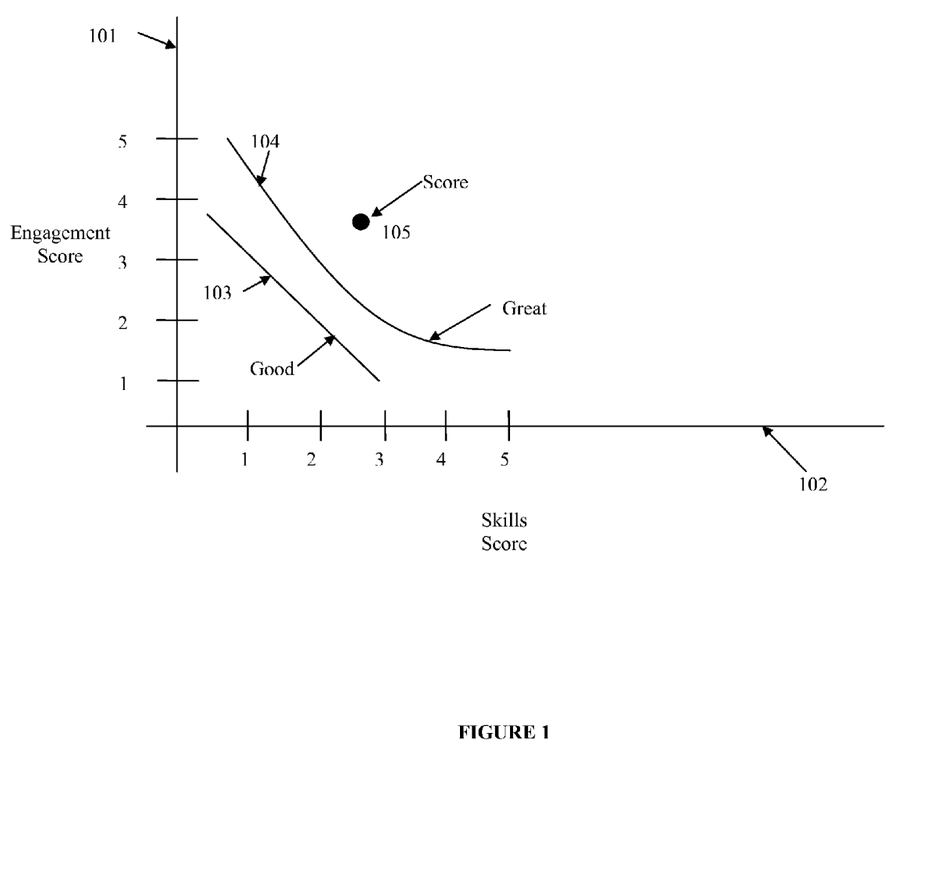
FIG. 1 shows a 2-dimensional graph plotting an employee's engagement score and his skills score.

As shown in FIG. 1, a third algorithm plots 105 the employee's engagement score against the employee's skills score on a two-dimensional graph where the vertical axis 101 is the engagement score and the horizontal axis 102 is the skills score. This graph also projects (1) a functional line on the graph for a good evaluation 103 as a function of the engagement score, and skills score, and (2) a functional line on the graph for a great evaluation 104 as a function of the engagement score and skills score.

Various embodiments of the invention then identify specific Activities to work on to improve the employee's performance, by selecting Activities to work on as a function of a combination of the lowest score Activities with the highest weight Activities. For example, the Activity score may be multiplied by the Activity weight and the lowest resulting coaching index score be used to select Activities to coach the employee for, to increase the employee's overall scores for engagement and skills. Embodiments of the system archive and maintain all evaluations and scores for employees and provide access to them to subsequent supervisors. This enables new supervisors to get the benefit of prior performance evaluations, to provide continuity in employee evaluation and coaching.

Examples of important and novel features of embodiments of the present invention include aspects of the engagement metrics, the engagement and skills score interactions, the Activity coaching targets, and the continuity provided across supervisors over time for an employee.

Figure 2:
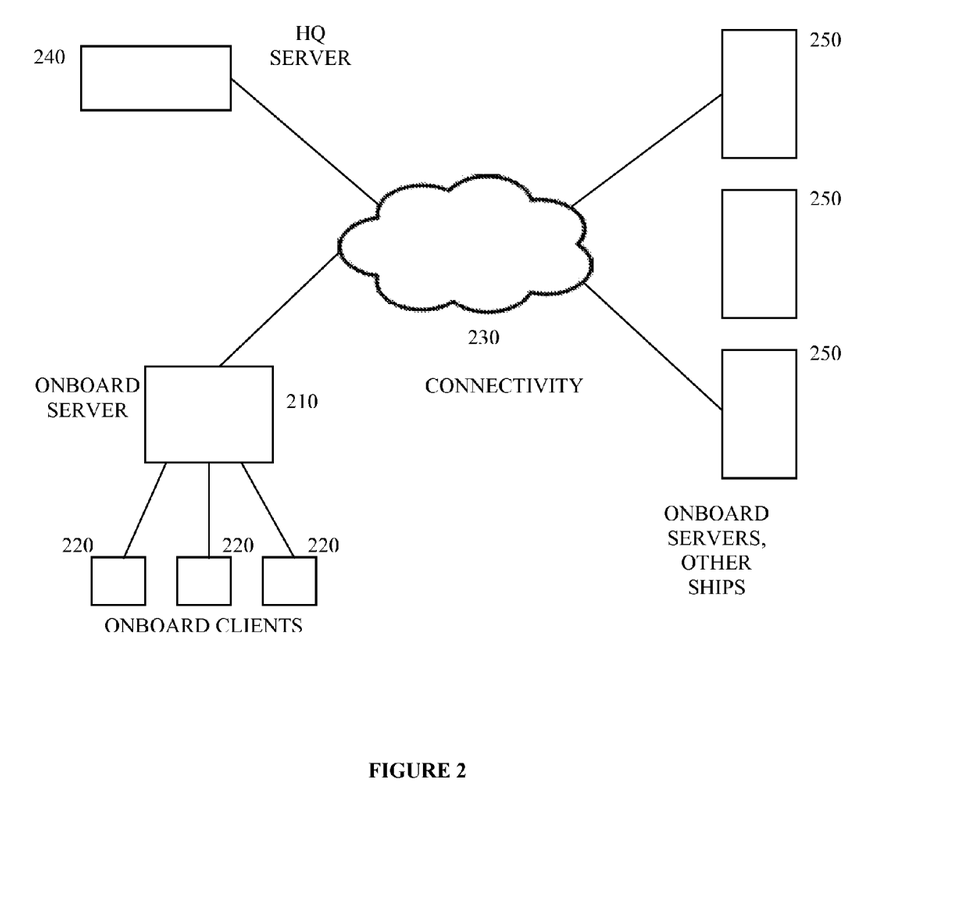
FIG. 2 shows one embodiment of the client-server architecture of a computer system of the present invention.
Figure 3A:
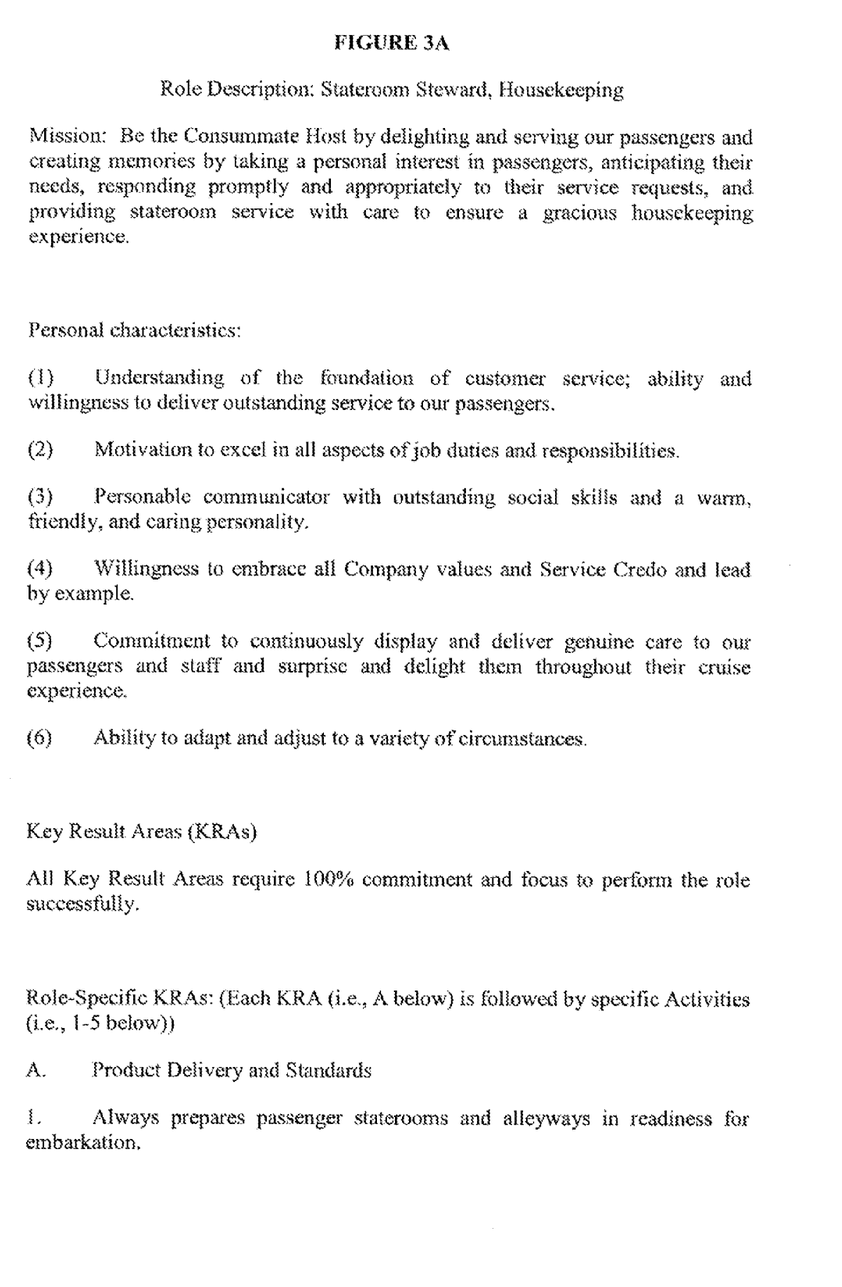
Figure 4A:
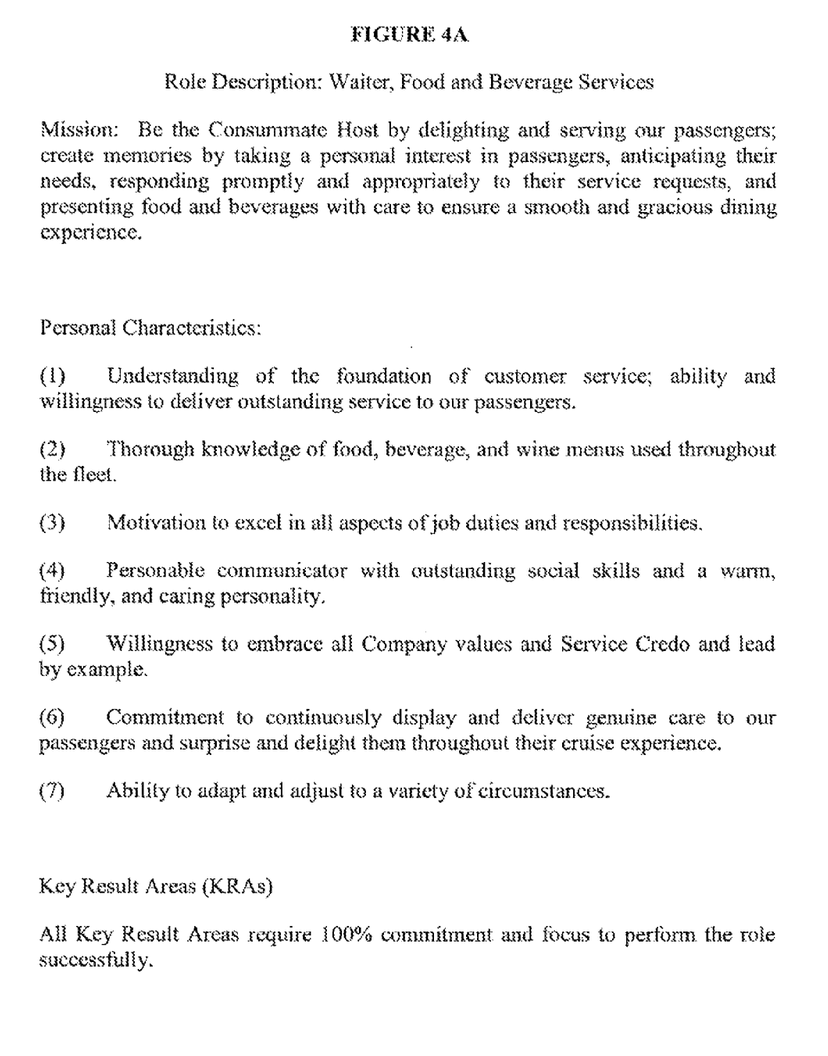
Figure 4D:
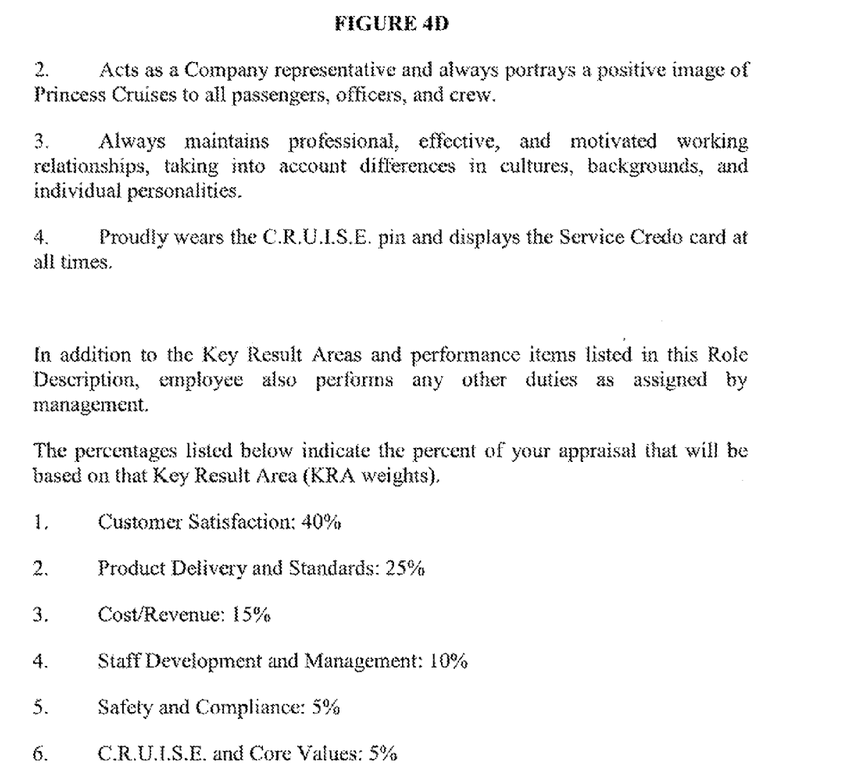

As shown in FIG. 2, various embodiments provide a client server hardware architecture, with clients 220 needing no more than a browser to access the HR application, which may embody the present invention and runs on the onboard server 210. The server 210 may be for an individual location or on an individual ship, and does not need to access other servers 240, 250 in order to function. However, each server 210, 240, 250 may access other servers 210, 240, 250 on land or other ships, through appropriate available means of connectivity 230, to communicate and transfer archives for individual employees as necessary from time to time, when employees move from one ship or location to another.

Embodiments may define Activities, KRAs and Roles Descriptions to fit individual installations. For example, embodiments may be developed for individual holiday cruise ships with their specific crew requirements. However, job descriptions, activities and KRAs may be developed for other installations such as commercial ships, airplanes, trains, or non-moving facilities, such as hotels, restaurants, industrial plants, refineries, trains or otherwise.

BRIEF DESCRIPTION OF THE DRAWINGS

Embodiments of the present invention are described herein, by way of example, in conjunction with the following figures.

FIGS. 3A-3C show an embodiment of a Role Description for a stateroom steward.

FIGS. 4A-4D show an embodiment for a Role Description for a waiter.

EMBODIMENTS OF THE PRESENT INVENTION

Embodiments of the present invention may be implemented with a Lotus Notes application. However, any suitable software may be used.

Various embodiments may be adapted for an on-ship HR evaluation system for an individual holiday cruise ship. The larger ships of this type may have in the order of approximately 1,100 crew members.

Client Server Architecture

As shown in FIG. 2, various embodiments may use a server 210 on each individual ship that may be accessed by web browsers on the client computers 220 on board the ship. The ship server 210 may interact with other servers 250 on other ships and an on-shore server 240 from time to time, through appropriate connectivity 230, to transfer archives for individual employees to other on-board servers 250 on other ships, when the employee transfers, or to a central headquarters server 240 to facilitate access to all evaluations within a fleet or multiple locations of a company.

Levels of Access

Embodiments of the present system offer levels of access in a chain of command. Individual crew members may access their own evaluation files, but not the evaluation files of others. Each crew member is evaluated by various appraisers, and each appraiser is given access to each crew member's data that they evaluate. Each evaluator may access his own evaluations of a crew member and evaluations of the crew member by subordinates of the evaluator, but not evaluations by superiors of the evaluator. The captain can access all evaluations.

Any user in an embodiment, by using a browser client 220, can access the HR application running on an on-board server 210. The user may access the server 210 through the browser GUI (graphical user interface), which may be a dashboard to access the application.

In an embodiment, any evaluator who accesses the system through the dashboard receives a list of the employees that they are to evaluate. For each evaluation of each employee, the evaluator receives a detailed template of information regarding the employee, to facilitate the evaluation of the employee. In embodiments of the present invention an evaluation of each employee is done by evaluators at the end of each voyage, and at least one interim evaluation is done during each shipboard assignment for new employees and interim evaluations may be done for other employees as well.

Third Party Comments

In embodiments, a third-party commentator can add notes to an evaluation, where the commentator is not in the chain of command or a supervisor, and will not be executing a formal evaluation of an employee. Any evaluator in the chain of command for the employee can access these third-party notes.

In a unique security feature of embodiments of the present invention, third-party commentators cannot see the evaluations of the employee on which they are commenting. Only evaluators can see general notes by third parties regarding an employee.

A valuable, unique feature of the present invention is that the supervisors and appraisers (i.e., evaluators) can be changed in the system during the term of employment for which the individual employee is being evaluated. This is particularly important in the holiday cruise ship industry where there is a high level of constant movement of individual crew members between ships, so that the assignment of supervisors to individual employees being supervised changes constantly, and changes of supervisors often take place within the term of a given voyage by a crew member.

In embodiments of the present invention each individual appraiser may have a different dashboard view of data for a particular employee, compared to the HR Manager who is higher in the chain of command. The HR Manager, for example, may receive additional statistics, such as data comparing an employee's evaluation with crew-wide metrics, that may not be visible to individual evaluators or the individual crew member himself.

Role Descriptions, Key Result Areas and Activities

In embodiments of the present invention, each Role Description (i.e., job) has a specific definition that includes specific, defined Key Result Areas (KRAs). Each KRA is defined with specific Activities. Each KRA may be made up of up to ten Activities. Within each Role Description, for each KRA, each Activity may be given a numerical engagement score 101, and a numerical skills score 102, on a scale, e.g., of 1 to 5 (with 5 being best), which may be in addition to a narrative evaluation. The engagement score and narrative evaluates the employee's personal engagement and interaction with people on the job (e.g., co-workers and customers) and engagement with the job for each Activity. The skills score and narrative measure the knowledge and technical skills that the employee has for each Activity. The skills score may also be measured with a numerical score and a narrative evaluation. Each Activity numerical score is given disproportionate special weighting in algorithms to evaluate overall performance indexes for the employees, for example, for an engagement index number 101, and a skills index number 102.

Once an appraiser completes an evaluation of an employee, the appraiser can route his evaluation to his supervisor, or whoever is next to evaluate in the approval process. Embodiments of the present invention provide each appraiser with the name of the next person to appraise the employee, if any.

Embodiments of the present invention allow a user to click on any term, name of Activity, Role Description, or KRA to get definitions or descriptions of what the person does.

Embodiments of the present invention provide each supervisor and appraiser with a list for each individual to be evaluated, a list of what aspects to review and approve, and when completed, who to pass the appraisal on to for the next evaluation. Embodiments of the present invention also indicate what will be done by the indicated next party to receive the appraisal in the review process.

At the end of the process, embodiments of the present invention allow the evaluated employee to see the entire evaluation and who said what about the employee, the overall scores for engagement and skill, a two-dimensional graph of the engagement score 101 and skills score 102 (see FIG. 1), and other more specific evaluations and third-party notes and comments.

Embodiments of the present invention calculate a single evaluation score with an algorithm which is a function of the quantitative evaluation score on each Activity for each KRA for the employee and his role. This algorithm can be, for example, a weighted summation of the individual numerical scores from each Activity (for engagement and for skills), with each Activity receiving its own weighting.

Examples of the text of two Role Descriptions (job descriptions) and their respective KRAs and Activities with weights, are reproduced herein, in FIGS. 3A-3C and FIGS. 4A-4D, FIGS. 3A-3C show the text from the stateroom steward role, and FIGS. 4A-4D show the text for the waiter role. These descriptions are in the system and available to all evaluators.

Backend Tracking, Coaching and Continuity

Embodiments of the present invention track the performance of individual employees, and calculate specific Activities to be coached with the employee to improve their overall performance.

The archives of all the evaluations and coaching analyses are passed to each new supervisor of a crew member. Supervisors are often changed at the end of an assignment for a crew member, or during an assignment of a crew member. There tends to be a lot of turnover in layers of supervision in holiday cruise ship environments, and other application environments for embodiments, so that it is useful for continuity of coaching comments and evaluations in general to allow flexible and frequent changes of supervisory access to individual employee evaluations.

For each employee evaluation, an individual engagement score is calculated as a function of the engagement scores in the evaluation for each Activity for that employee. Likewise, an employee's skills score is calculated as a function of the individual skills scores for each Activity in the evaluation for that employee. In embodiments of present invention, a narrative evaluation for engagement and skills for each Activity may also be given. The evaluator may give the numerical scores on a scale 101, 102, for example from 1 to 5, with 5 being highest and 1 being lowest.

For example, the engagement algorithm may give each Activity engagement score a weight, and then take a weighted average of all the individual Activity engagement scores to give an overall engagement score.

Similarly, each Activity may get a weight in the skill algorithm. Then the skill algorithm may calculate a weighted average of all the Activities skill scores to give an overall skill value.

In embodiments of the present invention, each evaluation provides the individual Activity scores, with the individual Activity narration evaluations, together with the overall engagement score and skill score. As shown in FIG. 1, the overall engagement score and skills score are plotted 105 on a two-dimensional graph with the engagement score on one axis 101 and the skills score on the other axis 102. The two-dimensional graph also has a color gradient describing the levels required for a good evaluation 103, and the levels required for a great evaluation 104.

Each employee gets an individual engagement score and skills score for each Activity for his job. Also, each employee gets an overall engagement number 105 and skills number 105 for his job.

Engagement evaluates the level of involvement or engagement with the job and the customers and co-workers on the job. This endeavors to measure and quantify a breakdown of the factors for "people skills". The skills evaluation and index evaluates the technical knowledge and skills of the job for each individual.

Activities for Coaching

Embodiments of the present invention take the Activity skill scores and the Activity engagement scores to identify what Activities are most important to focus on for each employee to increase the employee's overall performance. These target Activities for coaching are identified by an algorithm that is a function of the lowest Activity scores and the highest Activity weights.

For example, the algorithm may simply multiply each individual Activity score by that individual Activity weight, and then select the lowest resulting multiples for the focus of subsequent coaching to raise the overall scores of the employee.

Supervisors will receive all evaluations and coaching analyses and reports for all employees under their supervision 30 days before the employee joins the vessel for their assignment. Continuity is then provided by embodiments of the present invention from the first day of the new voyage under a new supervisor. Then on the first day of the voyage, each supervisor may be fully informed about each employee, and meet with them about the continuation of their prior Activity coaching to improve their performance. This provides continuity of coaching and continuity of development of employee quality.

Embodiments of the present invention are customizable for each Role Description (i.e., job) since each job description is written for that job, and each KRA is defined for that job, and each Activity is defined for the KRA. The Role Descriptions, KRAs and Activities are not generic but are customized to each job.

In this way, embodiments of the present invention provide long-term tracking of development of employees in their job in a specific manner, in an environment where there is a lot of re-assignment of supervisors to employees. Long-term development, coaching, and tracking of development is not episodic and disconnected, but continuous across vessel assignments and supervisors for each employee.

In embodiments of the present invention it is important for the Role Description to be accurately defined and related to each of its KRAs and Activities and for each KRA and Activity to be accurately defined.

The existence of the mathematical algorithms to calculate individual engagement scores 101 and skill scores 102 each employee, is unique and important. However, the exact mathematical definition of the algorithms may be modified and flexible, as indicated by individual job requirements.

It is unique and valuable to the present invention that there is a quantification of engagement across KRAs and Activities for each employee for each Role Description. Prior appraisal systems at most may have a single question for people skills in an employee's evaluation, but without a detailed breakdown of engagement in different Activities and a quantification for each KRA. Also, prior practice does not develop individual Activity coaching targets to increase engagement scores and skill scores.

In the hardware platform, as shown in FIG. 2, each server 210 on each ship may run independently of other servers 240, 250; and the workstations 220 on that ship may access the evaluations in the server 210 on that ship, without the onboard remote server 210 accessing other servers 250 on other ships in the fleet or on shore 240 at headquarters. However, from time to time, the onboard server 210 may through its satellite or otherwise 230 access other onboard servers 250 on other ships, or the headquarter server 240 on shore, to transmit the archives of evaluations for specific employees to headquarters, or to other ships, when employees may move from ship to ship or in and out of the company. Connectivity 230 between servers 210, 240, 250 may be provided by any appropriate means, for example, links by wireless, Internet, satellite, 3G, 4G, landlines, or otherwise as used for servers to exchange data.

The onboard server 210, 250 may run Lotus Notes and Domino (from IBM) to execute the application for the present invention. Embodiments of the present invention may run Lotus Notes and any other software for embodiments, on Windows, Linux, AIX or other appropriate operating system. Any appropriate adequate software to run the system may be used. For example, embodiments of the present invention may use an onboard PC as a server 210 and onboard PC's and laptops for client 220 access to the server 210 from a browser. However, applications of the present invention are hardware-independent and can run on any appropriate hardware with any appropriate software. The client 220 to access the server 210 may need to support only a browser to access current embodiments of the present invention on the server, Embodiments of the present invention currently have a report module under development to output individual evaluation reports from the system. The report module may have other functions such as to calculate and output aggregate evaluation data and aggregate statistics across entire crews or subsections of crews, for entire fleets, for individual evaluations, individual KRA and Activity scores, and for skill index scores and engagement index scores, across crews and fleets and varying in time. These reports may also include aggregate statistics regarding Activities targeted for coaching focus and improvement statistics in the same over time.

Method Embodiments

Figure 5:
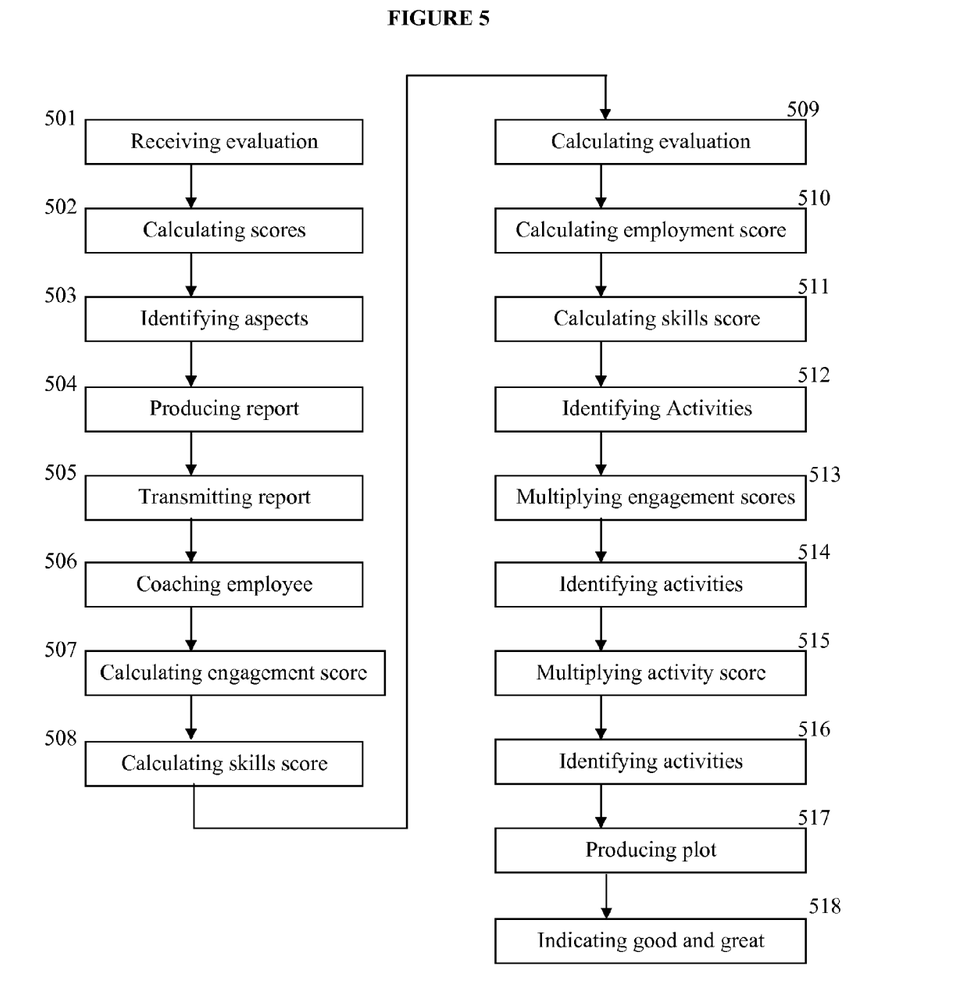
FIG. 5 shows a flow chart for a method embodiment of the present invention.

FIG. 5 shows a flow chart for a method embodiment of the present invention. One method embodiment using a computer system comprises (a) receiving 501 with a computer system an employee evaluation, for an employee with a job; (b) calculating 502 with the computer system an engagement score, and a skills score, for the employee, based on the evaluation for that employee; (c) identifying 503 using the computer, specific aspects of the job of the employee, for which the employee is to be coached to improve the employee's evaluation; (d) producing 504 a report of the evaluation, engagement score, skills score, and identified aspects of the job to be coached; (e) performing 505 a step which is member of the group consisting of (i) storing the report in the computer system; and (ii) transmitting the report from the computer system; and (f) coaching 506 the employee regarding the identified aspects of the job.

The method embodiment may further comprise (a) calculating 507 using the computer system with an engagement algorithm, an employee engagement score as a function of the engagement scores for each Activity, and (b) 508 calculating using the computer system with a skills algorithm, an employee skills score as a function of the skills score for each Activity.

The method embodiment may further comprise (a) calculating 509 using the computer system and an evaluation algorithm, an employee evaluation score as a function of all Activity skills scores and all Activity engagement scores.

The embodiment may further comprise (a) calculating 510 using the engagement algorithm, the employee engagement score as a weighted average of all the Activity engagement scores, and (b) calculating 511 using the skills algorithm, the employee skills score as a weighted average of all the Activity skills scores.

The method embodiment, wherein the aspects of the job identified to be coached are identified Activities to be coached, may further comprise identifying 512 the Activities to be coached by an identifying algorithm which is a function of the Activity skills scores, and the Activity engagement scores.

The method embodiment may further comprise an identifying algorithm, wherein the identifying algorithm comprises (a) multiplying 513 each Activity engagement score by that Activity weight, to get a weighted Activity engagement score, (b) identifying 514 the Activities with the lowest weighted Activity engagement scores as Activity for engagement coaching, (c) multiplying 515 each Activity skills score by that Activity weight, to get a weighted Activity skills score, and (d) identifying 516 the Activities with the lowest weighted Activity skills scores as Activities for skills coaching.

The method embodiment may further comprise (a) producing 517 as part of the report a plot of the employee's engagement score against the employee's skills score on a two-dimensional graph, and (b) indicating 518 on the plot what engagement scores and skills scores are needed for a good evaluation, and what engagement scores and skills scores are needed for a great evaluation.

Other Matters

The present invention requires data and calculations that practically speaking should be maintained and executed on a computer or computer system. Any appropriate computer hardware and software platform may be used, and the present invention is not limited to the hardware or software platform and components of any particular vendor, unless specified otherwise herein.

As used herein, a "computer" or "computer system" may be, for example and without limitation, either alone or in combination, a personal computer (PC), server-based computer, mainframe, server, microcomputer, minicomputer, laptop, personal data assistant (PDA), cellular phone, pager, processor, including wireless or wireline varieties thereof, or any other computerized device capable of configuration for receiving, storing or processing data for standalone application or over a networked medium or media.

Computers and computer systems described herein may include operatively associated non-transitory computer-readable memory media such as memory for storing software applications used in obtaining, processing, storing or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD compact disc, memory stick, ROM (read only memory), RAM (random access memory), PROM (programmable ROM), EEPROM (extended erasable PROM), or other like computer-readable media.

In general, non-transitory computer-readable memory media may include any medium capable of storage of an electronic signal representative of data stored, communicated or processed in accordance with embodiments of the present invention. Where applicable, method steps described herein may be embodied or executed as instructions stored on a non-transitory computer-readable memory medium or media.

It is to be understood that the figures and descriptions of embodiments of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as constriction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, or parts may be made within the principle and scope of the invention without departing from the invention as described in the following claims.

Various components of embodiments of the invention may be implemented as software code to be executed by a processor of any computer system using any type of suitable computer instruction type. The software code may be stored as a series of instructions or commands on a non-transitory computer readable memory medium. The term "non-transitory computer-readable memory medium" as used herein may include, for example, magnetic and optical memory devices such as diskettes, compact discs of both read-only and writeable varieties, optical disk drives, and hard disk drives. A non-transitory computer-readable memory medium may also include memory storage that can be physical, virtual, permanent, temporary, semi-permanent or semi-temporary.

The methods may be implemented by any suitable type of hardware (e.g., device, computer, computer system, equipment, component), software (e.g., program, application, instruction set, code), storage medium (e.g., disk, device), propagated signal, or combination thereof.

Embodiments of the invention may be implemented utilizing any suitable computer languages (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. These software applications, or computer programs may be stored on a computer readable medium (e.g., disk, device), such that when a computer reads the medium, the functions described herein are performed.

In general, elements of embodiments may be connected through a network having wired or wireless data pathways. The network may include any type of delivery system including, but not limited to a local area network (e.g., Ethernet), a wide area network (e.g., the Internet and/or World Wide Web), a telephone network (e.g., analog, digital, wired, wireless, PSTN, ISDN, and/or xDSL), a packet-switched network, a radio network, a television network, a cable network, a satellite network, and/or any other wired or wireless communications network configured to carry data. The network may include elements, such as, for example, intermediate nodes, proxy services, routers, switches and adapters configured to direct or deliver data.

In general, elements of embodiments may include hardware or software components for communicating with the network and with each other. These elements may be structured and arranged to communicate through the network using various communication protocols (e.g., HTTP, TCP/IP, UDP, WAP, WiFi Bluetooth) or to operate within or in concert with one or more other communications systems.

Elements of embodiments may include one or more servers (e.g. IBM® operating system servers, Linux operating system-based servers, Windows NT™ servers, Sybase) within the system.

A number of implementations of the present invention of the present invention have been described herein. Nevertheless, it will be understood that various modifications may be made and that other implementations are within the scope of the following claims.

The claims are:

1. A method using a computer system comprising:
   (a) receiving with a computer system an employee evaluation, for an employee with a job;
   (b) calculating with the computer system a personal engagement score, and a distinct technical skills score, for the employee, based on the evaluation for that employee, wherein the personal engagement score comprises an evaluation of a level of involvement of the employee, wherein the evaluation of the level of involvement of the employee comprises a numerical representation of an employee's (i) personal engagement and interaction with people on the job and (ii) personal engagement with each activity encompassing the job, wherein:
   (i) the job is defined in the computer system to comprise of a number of results, and each result is defined to comprise a number of activities; and
   (ii) each activity receives a numerical personal engagement score, and a distinct numerical technical skills score, and a narrative personal engagement evaluation, and a narrative technical skills evaluation, in the evaluation;
   (c) calculating using the computer system with a personal engagement algorithm, an employee personal engagement score as a function of the personal engagement scores for each activity;
   (d) calculating using the computer system with a distinct technical skills algorithm, an employee technical skills score as a function of the distinct technical skills score for each activity;
   (e) identifying, using the computer, specific aspects of the job of the employee, for which the employee is to be coached to improve the employee's evaluation;
   (f) producing a report of the evaluation, the personal engagement score, the distinct technical skills score, and identified aspects of the job to be coached;
   (g) performing a step which is selected from a group consisting of:
   (i) storing the report in the computer system; and
   (ii) transmitting the report from the computer system; and
   (h) coaching the employee regarding the identified aspects of the job.

2. The method of claim 1, further comprising:
   (a) calculating using the computer system and an evaluation algorithm, an employee evaluation score as a function of all activity technical skills scores and all activity personal engagement scores.

3. The method in claim 1, further comprising:
   (a) calculating using the personal engagement algorithm, the employee personal engagement score as a weighted average of all the activity personal engagement scores, and
   (b) calculating using the distinct technical skills algorithm, the employee technical skills score as a weighted average of all the activity technical skills scores.

4. The method in claim 1:
   (a) wherein the aspects of the job identified to be coached are identified activities to be coached, and
   (b) identifying the activities to be coached by an identifying algorithm which is a function of the activity technical skills scores, and the activity personal engagement scores.

5. The method in claim 4, wherein the identifying algorithm comprises:
   (a) multiplying each activity personal engagement score by that activity weight, to get a weighted activity personal engagement score,
   (b) identifying the activities with the lowest weighted activity personal engagement scores as activities for personal engagement coaching,
   (c) multiplying each activity technical skills score by that activity weight, to get a weighted activity technical skills score, and
   (d) identifying the activities with the lowest weighted activity technical skills scores as activities for technical skills coaching.

6. The method in claim 1, further comprising:
(a) producing as part of the report a plot of the employee's personal engagement score against the employee's distinct technical skills score on a two-dimensional graph, and
(b) indicating on the plot what personal engagement scores and distinct technical skills scores are needed for a good evaluation, and what personal engagement scores and distinct technical skills scores are needed for a great evaluation.

7. A computer system for employee evaluation and coaching comprising:
(a) a computer memory;
(b) a programmable processor in electronic communication with the memory, the processor configured to execute the method comprising:
 (i) receiving with the computer system an employee evaluation, for an employee with a job;
 (ii) calculating with the computer system a personal engagement score, and a distinct technical skills score, for the employee, based on the evaluation for that employee, wherein the personal engagement score comprises an evaluation of a level of involvement of the employee, wherein the evaluation of the level of involvement of the employee comprises a numerical representation of an employee's (i) personal engagement and interaction with people on the job and (ii) personal engagement with each activity encompassing the job, wherein:
  (1) the job is defined in the computer system to comprise of a number of results, and each result is defined to comprise a number of activities; and
  (2) each activity receives a numerical personal engagement score, and a distinct numerical technical skills score, and a narrative personal engagement evaluation, and a narrative technical skills evaluation, in the evaluation;
 (iii) calculating using the computer system with a personal engagement algorithm, an employee personal engagement score as a function of the personal engagement scores for each activity;
 (iv) calculating using the computer system with a distinct technical skills algorithm, an employee technical skills score as a function of the distinct technical skills score for each activity;
 (v) identifying, using the computer, specific aspects of the job of the employee, for which the employee is to be coached to improve the employee's evaluation;
 (vi) producing a report of the evaluation, the personal engagement score, the distinct technical skills score, and identified aspects of the job to be coached;
 (vii) performing a step which is selected from a group consisting of:
  (a) storing the report in the computer system; and
  (b) transmitting the report from the computer system;
 (viii) coaching the employee regarding the identified aspects of the job.

8. The computer system in claim 7, wherein the processor is further configured to execute the step of:
(a) calculating using the computer system and an evaluation algorithm, an employee evaluation score as a function of all activity technical skills scores and all activity personal engagement scores.

9. The computer system in claim 7, wherein the processor is further configured to execute the steps of:
(a) calculating using the personal engagement algorithm, the employee personal engagement score as a weighted average of all the activity personal engagement scores, and
(b) calculating using the distinct technical skills algorithm, the employee technical skills score as a weighted average of all the activity technical skills scores.

10. The computer system in claim 7, wherein:
(a) the aspects of the job identified to be coached are identified activities to be coached, and
(b) the processor is further configured to execute the step of identifying the activities to be coached, by an identifying algorithm which is a function of the activity technical skills scores and the activity personal engagement scores.

11. The computer system in claim 10, wherein the identifying algorithm comprises:
(a) multiplying each activity personal engagement score by that activity weight, to get a weighted activity personal engagement score,
(b) identifying the activities with the lowest weighted activity personal engagement scores as activities for personal engagement coaching,
(c) multiplying each activity technical skills score by that activity weight, to get a weighted activity technical skills score, and
(d) identifying the activities with the lowest weighted activity technical skills scores as activities for technical skills coaching.

12. The computer system in claim 7, wherein the processor is further configured to execute the steps of:
(a) producing as part of the report a plot of the employee's personal engagement score against the employee's technical skills score on a two-dimensional graph, and
(b) indicating on the plot what personal engagement scores and technical skills scores are needed for a good evaluation, and what personal engagement scores and technical skills scores are needed for a great evaluation.

* * * * *